(12) United States Patent
Komoriya

(10) Patent No.: US 12,552,368 B2
(45) Date of Patent: Feb. 17, 2026

(54) VEHICLE POSITION ESTIMATION SYSTEM WITH SENSING FOR OBJECT DETECTION AND ESTIMATION OF FEATURE POINTS

(71) Applicant: HITACHI ASTEMO, LTD., Hitachinaka (JP)

(72) Inventor: Yuichi Komoriya, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 259 days.

(21) Appl. No.: 18/009,767

(22) PCT Filed: Jun. 11, 2021

(86) PCT No.: PCT/JP2021/022315
§ 371 (c)(1),
(2) Date: Dec. 12, 2022

(87) PCT Pub. No.: WO2022/034735
PCT Pub. Date: Feb. 17, 2022

(65) Prior Publication Data
US 2023/0242102 A1    Aug. 3, 2023

(30) Foreign Application Priority Data

Aug. 11, 2020 (JP) ................................. 2020-135698

(51) Int. Cl.
*B60W 30/09* (2012.01)
*B60W 40/12* (2012.01)
*G01C 21/30* (2006.01)

(52) U.S. Cl.
CPC ............ *B60W 30/09* (2013.01); *B60W 40/12* (2013.01); *G01C 21/30* (2013.01); *B60W 2554/80* (2020.02)

(58) Field of Classification Search
CPC .. B60W 30/09; B60W 40/12; B60W 2554/80; G01C 21/30
See application file for complete search history.

(56) References Cited

U.S. PATENT DOCUMENTS

| 11,884,273 B2* | 1/2024 | Uemura ............... B62D 15/025 |
| 2016/0003946 A1* | 1/2016 | Gilliland ................ G01S 17/10 |
| | | 356/5.01 |

(Continued)

FOREIGN PATENT DOCUMENTS

| JP | 2004-206267 A | 7/2004 |
| JP | 2005-318568 A | 11/2005 |

(Continued)

OTHER PUBLICATIONS

International Search Report with English Translation and Written Opinion of International Application No. PCT/JP2021/022315 dated Aug. 17, 2021.

*Primary Examiner* — Scott A Browne
*Assistant Examiner* — Terry C Buse
(74) *Attorney, Agent, or Firm* — Foley & Lardner LLP

(57) ABSTRACT

A position estimation system provided in a vehicle can include a front sensor, a peripheral sensor, a position estimation device, and a control device. The position estimation device can be configured to determine weights for each of a plurality of pieces of information related to a state and a surrounding environment of the vehicle, the plurality of pieces of information comprising vehicle speed, steering angle, traveling environment, predicted curvature, and surrounding environment. The position estimation device can then select whether to use a plurality of feature point groups including a part of the plurality of feature points detected by the front sensor and the peripheral sensor to estimate the position of the vehicle based on the weights.

6 Claims, 21 Drawing Sheets

(56) References Cited

U.S. PATENT DOCUMENTS

| | | | |
|---|---|---|---|
| 2020/0250854 A1 | 8/2020 | Toyoshi et al. | |
| 2021/0027486 A1 | 1/2021 | Kaino | |
| 2021/0256260 A1* | 8/2021 | Kaneko | G01C 21/28 |

FOREIGN PATENT DOCUMENTS

| | | |
|---|---|---|
| JP | 2018-146326 A | 9/2018 |
| JP | 2019-135620 A | 8/2019 |
| WO | WO-2019/082669 A1 | 5/2019 |
| WO | WO-2019/188391 A1 | 10/2019 |

* cited by examiner

FIG. 14
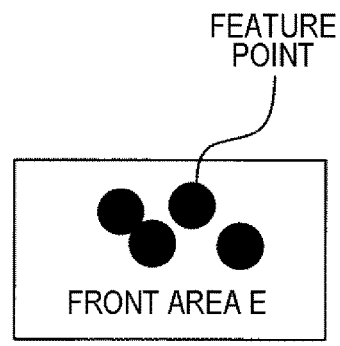
FEATURE POINT
FRONT AREA E
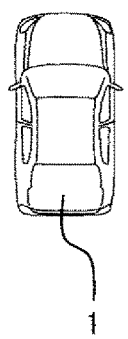
1
FIG. 15
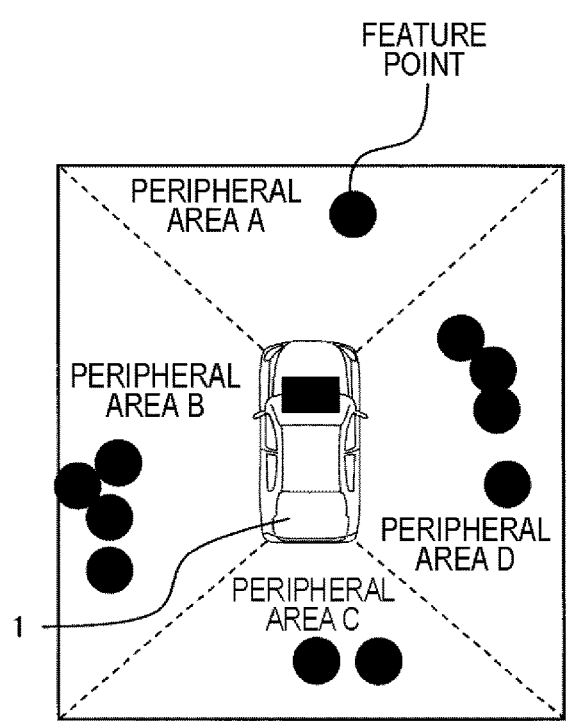
FEATURE POINT
PERIPHERAL AREA A
PERIPHERAL AREA B
PERIPHERAL AREA D
PERIPHERAL AREA C
1

POINT GROUP OF MAP (FEATURE POINT)

FEATURE POINT OBTAINED FROM MEASUREMENT RESULT OF SENSOR

POINT GROUP OF MAP (FEATURE POINT)

FEATURE POINT OBTAINED FROM MEASUREMENT RESULT OF SENSOR

POINT GROUP OF MAP (FEATURE POINT)

FEATURE POINT OBTAINED FROM MEASUREMENT RESULT OF SENSOR

VEHICLE POSITION ESTIMATION SYSTEM WITH SENSING FOR OBJECT DETECTION AND ESTIMATION OF FEATURE POINTS

TECHNICAL FIELD

The present invention relates to a position estimation system.

BACKGROUND ART

As a technique for safe driving, automatic driving, and the like, there is known a technique for determining a position of an own vehicle based on information obtained from sensors provided in the own vehicle. For example, PTL 1 discloses a position determination device that stores a plurality of pieces of reference data obtained by extracting characteristic portions of a scene image captured by an in-vehicle camera at intervals in a traveling direction on a road in association with corresponding positions on a map, performs matching processing of determining whether the scene image captured by the in-vehicle camera and the plurality of pieces of reference data match, and determines a position of a vehicle on the map on the basis of a position on the map corresponding to the reference data determined to match by the matching processing. The matching processing determines that determination data obtained by performing predetermined image processing of extracting characteristic portions on the scene image captured by the vehicle is matched with the reference data when a degree of matching between the determination data and the reference data is equal to or greater than a determination threshold, and determines that the determination data and the reference data are not matched when the degree of matching is less than the determination threshold. The determination threshold is adjusted so as to tend to decrease as the vehicle speed increases and so as to decrease as the steering amount of the steering wheel increases.

CITATION LIST

Patent Literature

PTL 1: JP 2005-318568 A

SUMMARY OF INVENTION

Technical Problem

However, in the prior art described above, by relaxing the condition for determining that the scene image captured by the in-vehicle camera and the reference data are matched with each other in a case where the scene image and the reference data are difficult to be matched with each other, the opportunities for the scene image and the reference data to be matched with each other are forcibly increased, and there is a possibility that the accuracy of the position determination of the own vehicle is deteriorated.

The present invention has been made in view of the above, and an object of the present invention is to provide a position estimation system capable of more accurately estimating a position of an own vehicle according to a traveling state or a traveling environment of the own vehicle.

Solution to Problem

In order to achieve the above object, the present invention provides a position estimation system provided in a vehicle, including: a front sensor configured to detect an object in front of the vehicle; a peripheral sensor configured to detect an object around the vehicle in a detection range, the detection range being a range shorter than the front sensor and including at least a left-right direction of the vehicle; a position estimation device configured to detect a plurality of feature points of an object from a detection result of at least one of a detection result of the front sensor and a detection result of the peripheral sensor, and estimate a position of the vehicle using the plurality of detected feature points; and a control device configured to control an operation of the vehicle based on an estimation result of the position estimation device. The position estimation device is configured to: weight each of a plurality of pieces of information related to a state of the vehicle and weigh information related to a surrounding environment of the vehicle; and select whether to use a plurality of feature point groups including a part of the plurality of feature points detected by the front sensor and the peripheral sensor for the position estimation for each of the feature point groups based on a result of the weighting.

Advantageous Effects of Invention

According to the present invention, the position of the own vehicle can be estimated more accurately according to the traveling state and the traveling environment of the own vehicle.

BRIEF DESCRIPTION OF DRAWINGS

FIG. 14 is a diagram for explaining a detection area.

FIG. 15 is a diagram for explaining a detection area.

DESCRIPTION OF EMBODIMENTS

Hereinafter, embodiments of the present invention will be described with reference to the drawings.

First Embodiment

A first embodiment of the present invention will be described with reference to FIGS. 1 to 27'.

Figure 1:
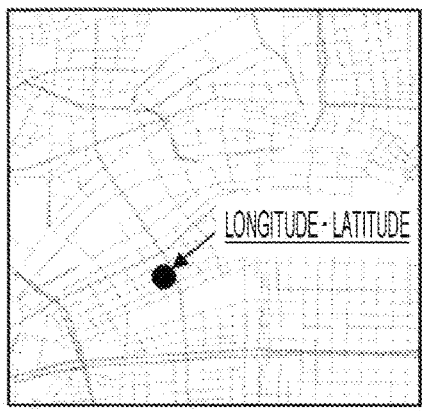
FIG. 1 is a diagram illustrating an example of position estimation by a position estimation system mounted on a vehicle.
Figure 2:
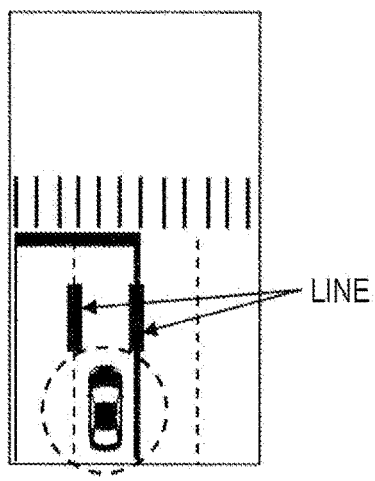
FIG. 2 is a diagram illustrating an example of position estimation by a position estimation system mounted on a vehicle.
Figure 3:
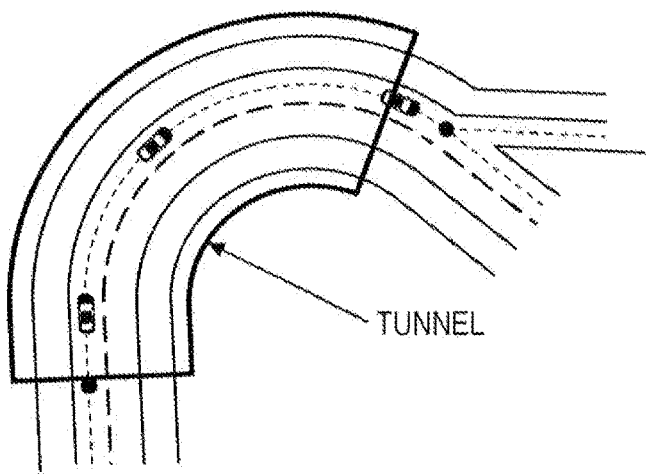
FIG. 3 is a diagram illustrating an example of position estimation by a position estimation system mounted on a vehicle.

FIGS. 1 to 3 are diagrams illustrating an example of position estimation by a position estimation system mounted on a vehicle.

Examples of position estimation (so-called own vehicle position estimation) by a moving body such as a vehicle include a method in which latitude and longitude on the earth of an own vehicle are estimated as absolute positions by a global navigation satellite system (GNSS) as illustrated in FIG. 1, a method in which a position of an own vehicle is estimated as a relative position with a surrounding structure (a line provided on a road, another object, or the like) from information obtained from a camera or the like as illustrated in FIG. 2, and a method in which a position of an own vehicle is estimated under an environment such as a tunnel by performing arithmetic processing by combining information from various sensors such as a gyro sensor and an acceleration sensor and information from the GNSS or the like (so-called dead reckoning) as illustrated in FIG. 3.

The position estimation system according to the present embodiment estimates the position of the own vehicle by comparing information obtained from detection results of various sensors and the like mounted on the own vehicle with map information prepared in advance. More specifically, feature points of objects around the own vehicle are detected by a sensor mounted on the own vehicle, and the position of the own vehicle on the map is estimated by associating the feature points with a map including information on feature points created in advance by preliminary measurement or the like. Hereinafter, details of such a position estimation system according to the present embodiment will be described.

Figure 4:
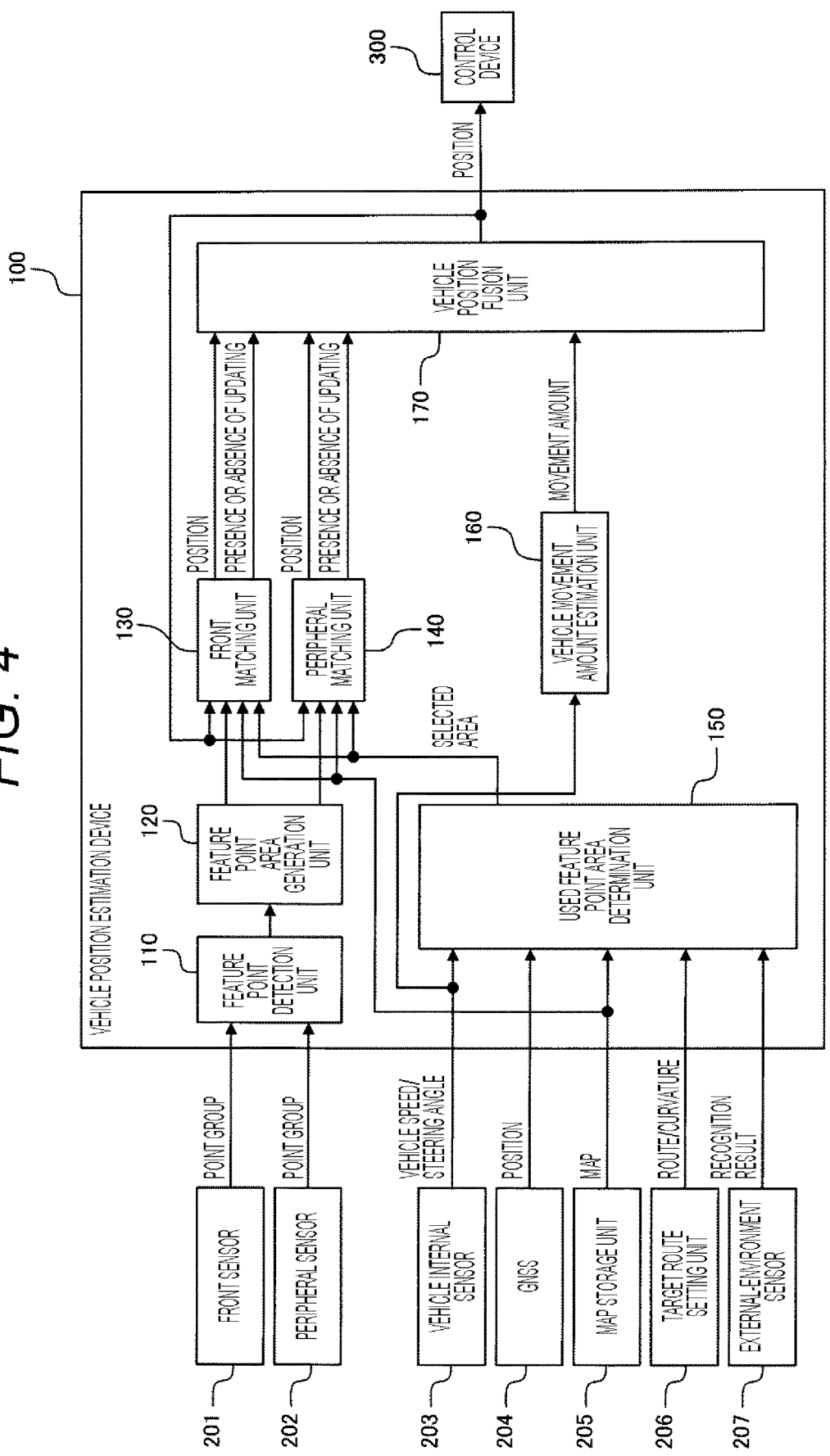
FIG. 4 is a functional block diagram schematically illustrating an overall configuration of a position estimation system.

FIG. 4 is a functional block diagram schematically illustrating an overall configuration of the position estimation system according to the present embodiment.

In FIG. 4, the position estimation system is schematically constituted by a front sensor 201, a peripheral sensor 202, a vehicle internal sensor 203, a GNSS 204, a map storage unit 205, a target route setting unit 206, an external-environment sensor 207, and an own vehicle position estimation device 100.

Figure 12:
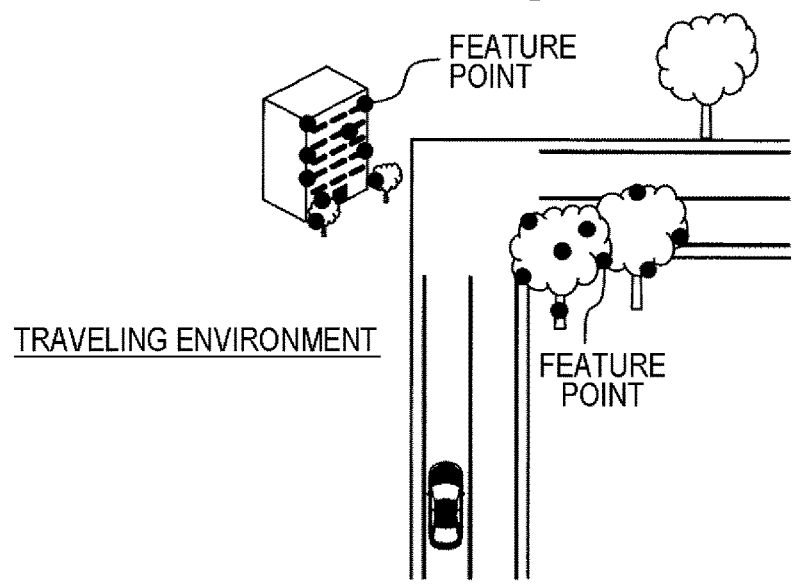
FIG. 12 is a diagram illustrating an example of three-dimensional point group data indicating feature points.

The front sensor 201 is a long distance narrow angle sensor that detects an object in front of the own vehicle 1 (see FIG. 12 and the like below). For example, in the present embodiment, a stereo camera is used, and an object is detected from a measurement result (image) obtained by the stereo camera, and is output as point group data indicating a position of a surface (or an inside) of the object. The front sensor 201 only needs to be able to detect an object in front of the own vehicle 1. For example, a method of detecting an object from an image obtained by a camera, or a method of detecting an object using a technology such as a RADAR (radio detection and ranging), a SONAR (sound navigation and ranging), or a LiDAR (light detection and ranging) may be used.

The peripheral sensor 202 is a short-distance omnidirectional sensor that detects an object around the own vehicle 1. For example, in the present embodiment, the peripheral sensor includes sensors 202a, 202b, 202c, and 202d using a plurality of riders whose detection ranges are the front, the left side, the rear, and the right side, respectively. The peripheral sensor detects the object from the obtained measurement result and outputs the object as point group data indicating the position of the surface (or the inside) of the object. The peripheral sensor 202 only needs to be able to detect an object around the own vehicle 1, and for example, a method of detecting an object from an image obtained by a camera or a method of detecting an object using a technology such as a RADAR (Radio Detecting and Ranging) or a SONAR (sound navigation and ranging) may be used.

The vehicle internal sensor 203 includes various sensors that detect information of the own vehicle 1, and is, for example, a vehicle speed sensor that detects a traveling speed of the own vehicle, a steering angle sensor that detects a steering angle, or the like.

The GNSS 204 is called a global navigation satellite system, and measures the position (that is, latitude and longitude) of the own vehicle 1 in the earth coordinate system.

The map storage unit 205 stores map information including a traveling environment of the own vehicle 1. In the map information, position information of feature points of a structure such as a road or a building is measured in advance, and is stored as, for example, three-dimensional point group data indicating feature points as illustrated in FIG. 12.

The target route setting unit 206 sets the travel route of the own vehicle 1 and the curvature thereof, and for example, when the own vehicle 1 is performing automatic traveling, the curvature is set from the travel route of the own vehicle set in the automatic traveling. When manual traveling is performed, the curvature of the travel route of the own vehicle is set based on a detection result from a sensor that acquires information around the own vehicle, including sensors such as the front sensor 201 and the peripheral sensor 202.

The external-environment sensor 207 detects information on the traveling environment of the own vehicle (for example, information on the presence or absence and position of other vehicles around the own vehicle) as a recognition result, and for example, the front sensor 201 and the peripheral sensor 202 may also be used, that is, the detection result of the front sensor 201 and the peripheral sensor 202 may be used as the detection result of the external-environment sensor 207. A sensor may be separately provided as the external-environment sensor 207. As a method used for the external-environment sensor 207, for example, a method of using a stereo camera to detect an object from a measurement result (image) obtained by the stereo camera, a method of detecting an object from an image obtained by a camera, or a method of detecting an object using a technology such as Radar (radio detection and ranging), SONAR (sound navigation and ranging), or LiDAR (light detection and ranging) may be used.

The own vehicle position estimation device estimates the position of the own vehicle on the basis of information from the front sensor 201, the peripheral sensor 202, the vehicle internal sensor 203, the GNSS 204, the map storage unit 205, the target route setting unit 206, and the external-environment sensor 207, and outputs an estimation result to a control device 300 that controls operations such as automatic driving and manual driving in the own vehicle 1. The own vehicle position estimation device 100 is schematically constituted by a feature point detection unit 110, a feature point area generation unit 120, a front matching unit 130, a peripheral matching unit 140, a used feature point area determination unit 150, a vehicle movement amount estimation unit 160, and a vehicle position fusion unit 170.

The feature point detection unit 110 detects a plurality of feature points of the detected object from point group data that is a measurement result of the front sensor 201 and the peripheral sensor 202.

The feature point area generation unit 120 associates the plurality of feature points detected by the feature point detection unit 110 with any of a plurality of predetermined detection areas, thereby dividing the plurality of feature points into a plurality of feature point groups each including a plurality of feature points.

Figure 13:
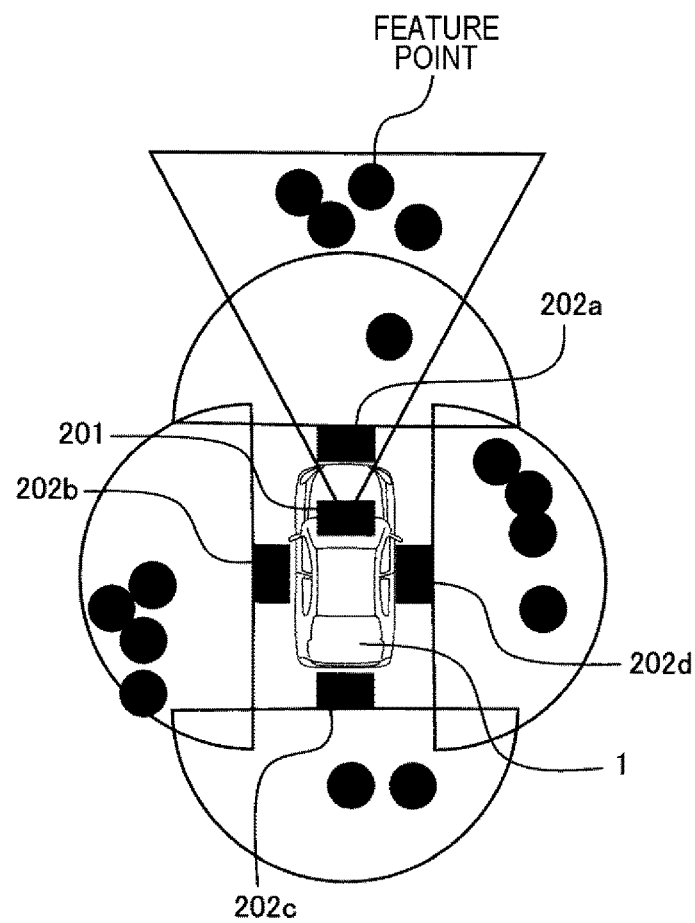
FIG. 13 is a diagram illustrating an example of detection ranges of a front sensor and peripheral sensors.

FIG. 13 is a diagram illustrating an example of detection ranges of the front sensor and the peripheral sensors, and FIGS. 14 and 15 are diagrams for explaining a detection area defined in the present embodiment.

As illustrated in FIG. 13, front sensor 201 has a long distance narrow angle in front of the own vehicle as a detection range, and detects an object within the detection range. In the peripheral sensor 202, the plurality of sensors 202a, 202b, 202c, and 202d installed around the own vehicle set the entire short distance range around the own vehicle as a detection range, and detects an object within the detection range.

As illustrated in FIGS. 14 and 15, a plurality of detection areas is defined in advance in front of and around the own vehicle 1. In the present embodiment, for example, a front area E is defined as a detection area which is in front of the own vehicle 1 and includes a certain range of a relatively long distance. Similarly, a peripheral area A is defined as a front detection area, a peripheral area B is defined as a left detection area, a peripheral area C is defined as a rear detection area, and a peripheral area D is defined as a right detection area for the periphery of the own vehicle 1 at a short distance.

In the present embodiment, a plurality of feature points (a plurality of feature point groups) detected from measurement results obtained by the front sensor 201 and the peripheral sensors 202 (sensors 202a, 202b, 202c, and 202d) are associated with preset detection areas (peripheral areas A, B, C, and D, front area E), thereby dividing the plurality of feature points into a plurality of feature point groups. That is, the plurality of feature points detected from the detection result of the front sensor 201 are included in the feature point group corresponding to the front area E. Similarly, the feature points detected from the detection results of the peripheral sensors 202 (sensors 202a, 202b, 202c, and 202d) are included in the feature point groups corresponding to the peripheral area A, the peripheral area B, the peripheral area C, and the peripheral area D, respectively.

Based on the information from the vehicle internal sensor 203, the GNSS 204, the map storage unit 205, the target route setting unit 206, and the external-environment sensor 207, the used feature point area determination unit 150 determines whether to use each feature point group belonging to each detection area (the front area E, and the peripheral areas A, B, C, and D) for the estimating of the position of the own vehicle 1. That is, for example, when the feature point group in the front area E is determined not to be used in the estimating of the own vehicle 1, the determination result (selected area value) is output to the front matching unit 130. Similarly, when the feature point group of the peripheral area A is determined not to be used in the estimating of the own vehicle 1, the determination result (selected area value) is output to the peripheral matching unit 140. Details of the determination processing in the used feature point area determination unit 150 will be described later.

The front matching unit 130 estimates and outputs the position of the own vehicle 1 on the map by comparing and associating a plurality of feature points (here, feature points belonging to the front area E) obtained from the detection result of the front sensor 201 with the feature points of the map stored in the map storage unit 205. Information indicating whether the result of the position estimation has been updated from the previous association processing is simultaneously output.

Figure 16:
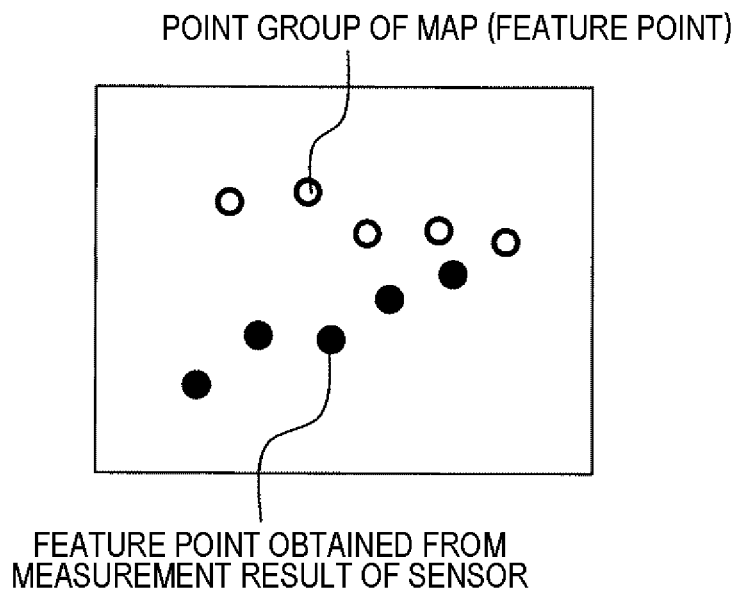
FIG. 16 is a diagram for explaining a method of the IPC.
Figure 17:
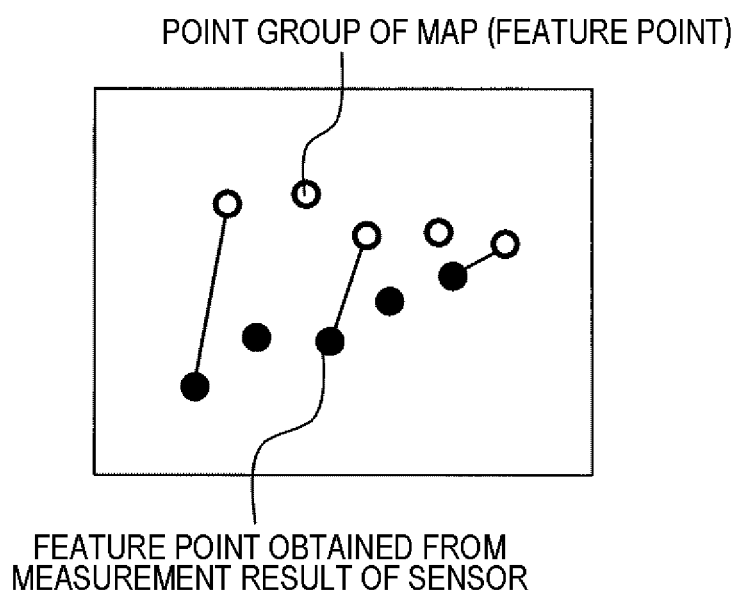
FIG. 17 is a diagram for explaining a method of the IPC.
Figure 18:
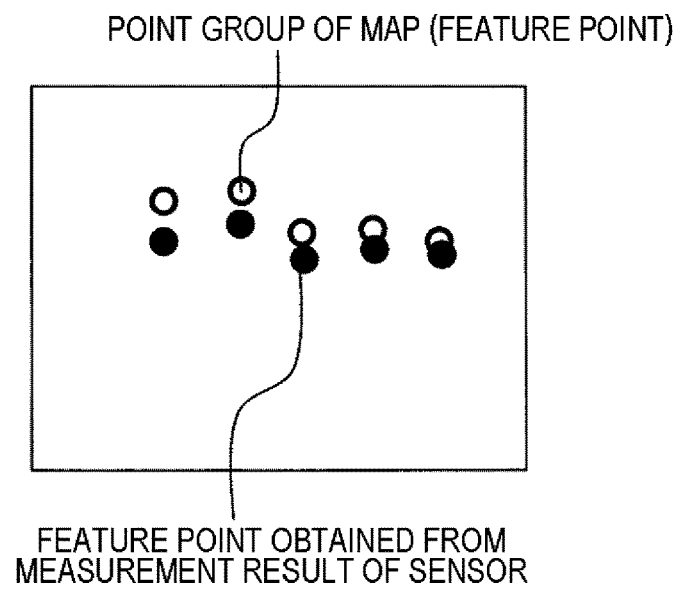
FIG. 18 is a diagram for explaining a method of the IPC.

Various methods can be considered for estimating the position of the own vehicle 1 by associating the feature point of the front area E with the feature point of the map. For example, it is conceivable to use an iterative closest point (IPC) method illustrated in FIGS. 16 to 18. In this case, first, as illustrated in FIG. 17, the nearest feature point is searched and associated with the feature point of the feature point group of the front area E and the feature point of the feature point group of the map as illustrated in FIG. 16, and the position of the feature point group of the front area E is adjusted so as to minimize the difference between the positions of the associated feature points as illustrated in FIG. 18. Then, when the processing of FIGS. 16 to 18 is repeated and the difference between the feature point groups satisfies a predetermined condition, it is determined that the feature point group in the front area E and the feature point group on the map represent the same object, and the position of the own vehicle 1 on the map is estimated.

The front matching unit 130 does not perform the position estimation using the feature point of the front area E and does not output the result when the used feature point area determination unit 150 described later determines not to use the feature point of the front area E for the position estimation (that is, when the selected area value of the front area E is 0).

Similarly, the peripheral matching unit 140 estimates and outputs the position of the own vehicle 1 on the map by comparing and associating a plurality of feature points (here, feature points belonging to the peripheral areas A, B, C, and D, respectively) obtained from the detection result of the peripheral sensor 202 (sensors 202a, 202b, 202c, and 202d) with the feature points of the map stored in the map storage unit 205. Information indicating whether the result of the position estimation has been updated from the previous association processing is simultaneously output. As a method of estimating the position of the own vehicle 1 by associating the feature points belonging to the peripheral areas A, B, C, and D with the feature points of the map, a method similar to that of the front matching unit 130 can be used.

The peripheral matching unit 140 does not perform position estimation and does not output a result using feature points of a peripheral area determined not to use feature points for position estimation by the used feature point area determination unit 150 described later (that is, the peripheral area with the selected area value=0).

Figure 5:
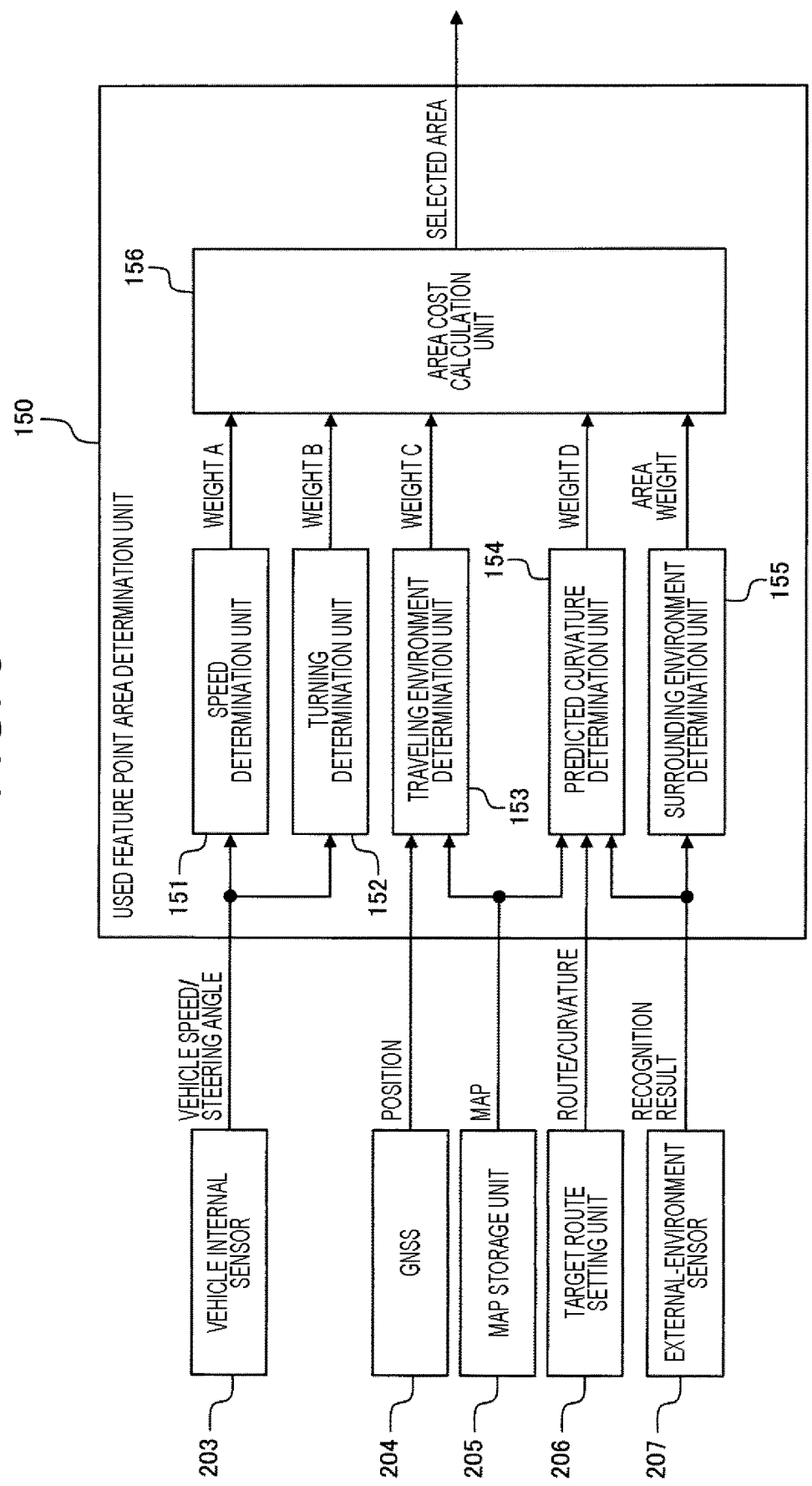
FIG. 5 is a functional block diagram schematically showing an overall configuration of a used feature point area determination unit.

FIG. 5 is a functional block diagram schematically illustrating an overall configuration of a used feature point area determination unit according to the present embodiment.

In FIG. 5, the used feature point area determination unit 150 is schematically constituted by a speed determination unit 151, a turning determination unit 152, a traveling environment determination unit 153, a predicted curvature determination unit 154, a surrounding environment determination unit 155, and an area cost calculation unit 156.

Figure 6:
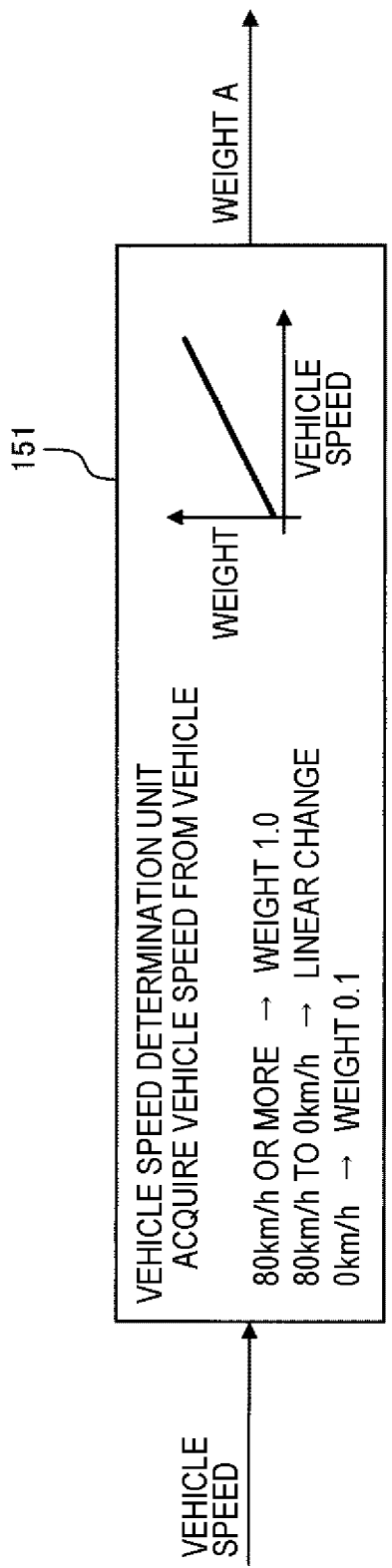
FIG. 6 is a diagram illustrating processing contents of a speed determination unit.

FIG. 6 is a diagram illustrating processing contents of the speed determination unit.

As illustrated in FIG. 6, the speed determination unit 151 calculates a weight based on the vehicle speed information acquired from the vehicle internal sensor 203 (that is, weighting of information related to the vehicle speed is performed), and outputs a calculation result (weight A). For example, the speed determination unit 151 prepares in advance a table in which the weight A increases as the vehicle speed increases, sets the weight A to 1.0 when the vehicle speed is 80 km/h or more, calculates the weight A according to the table when the vehicle speed is less than 80 km/h and greater than 0 km/h, and sets the weight A to 0.1 when the vehicle speed is 0 km/h. Various numerical values in the above processing are examples and can be changed as appropriate.

Figure 7:
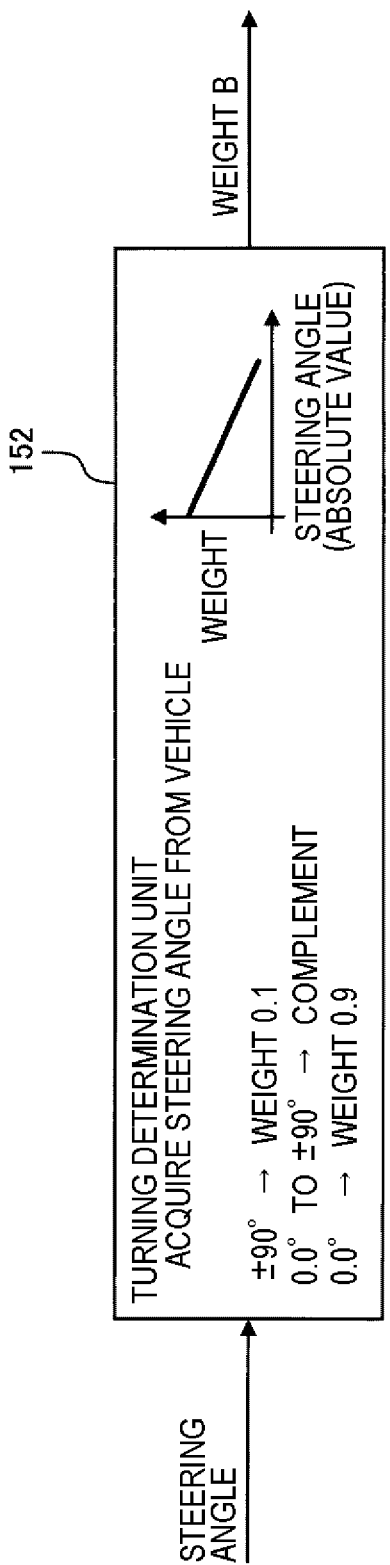
FIG. 7 is a diagram illustrating processing contents of a turning determination unit.

FIG. 7 is a diagram illustrating processing contents of the turning determination unit.

As illustrated in FIG. 7, the turning determination unit 152 calculates a weight on the basis of the steering angle information acquired from the vehicle internal sensor 203 (that is, weighting of information related to a steering angle is performed) and outputs a calculation result (weight B). For example, the turning determination unit 152 prepares in advance a table in which the weight B decreases as the steering angle (absolute value) increases, and sets the weight B to 0.1 when the absolute value of the steering angle is 90°, calculates the weight B according to the table when the absolute value of the steering angle is less than 90° and larger than 0.0°, and sets the weight B to 0.9 when the steering angle is 0°. Various numerical values in the above processing are examples and can be changed as appropriate.

Figure 8:
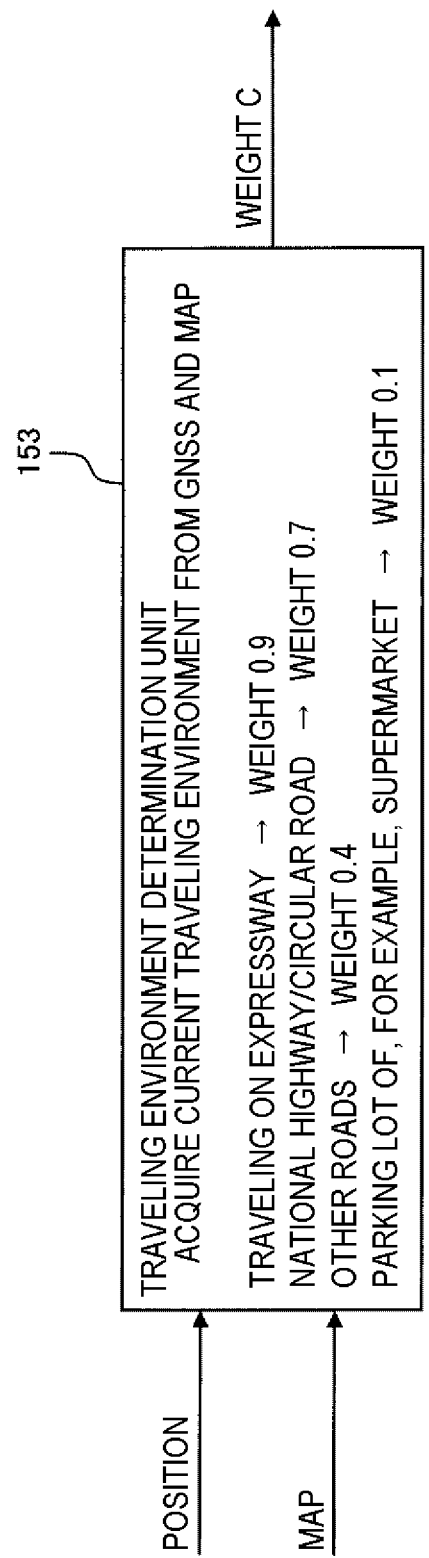
FIG. 8 is a diagram illustrating processing contents of a traveling environment determination unit.

FIG. 8 is a diagram illustrating processing contents of the traveling environment determination unit.

As illustrated in FIG. 8, the traveling environment determination unit 153 determines the traveling environment on the basis of the position information from the GNSS 204 and the map information from the map storage unit 205, calculates a weight corresponding to the traveling environment (that is, weighting of information related to the traveling environment is performed), and outputs a calculation result (weight C). The traveling environment determination unit 153 has weighting information corresponding to the traveling environment of the own vehicle 1 in advance. For example, if the traveling environment of the own vehicle 1 is an expressway, the weight C is 0.9. If the traveling environment of the own vehicle 1 is a national highway or a circular road, the weight C is 0.7. If the traveling environment of the own vehicle 1 is other roads, the weight C is 0.4. If the traveling environment of the own vehicle 1 is a parking lot such as a supermarket, the weight C is 0.1. Various numerical values in the above processing are examples and can be changed as appropriate.

Figure 9:
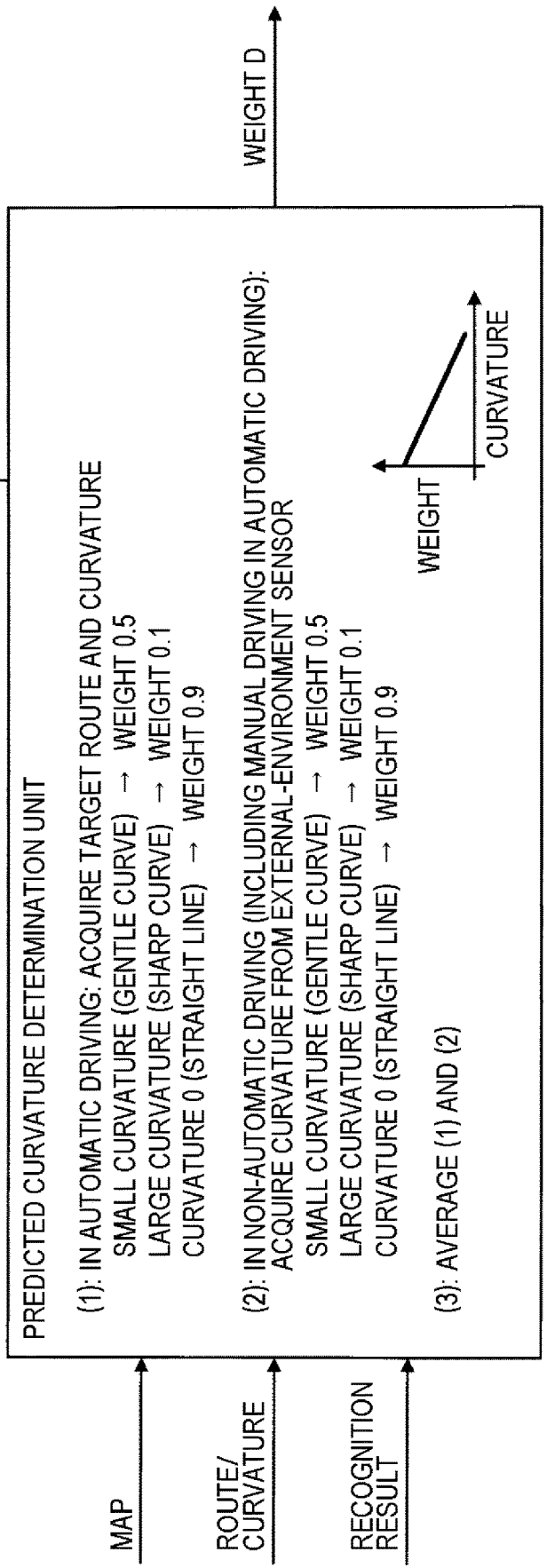
FIG. 9 is a diagram illustrating processing contents of a predicted curvature determination unit.

FIG. 9 is a diagram illustrating processing contents of the predicted curvature determination unit.

As illustrated in FIG. 9, on the basis of the map information from the map storage unit 205, the route information and curvature information from the target route setting unit 206, and the recognition result information from the external-environment sensor 207, the predicted curvature determination unit 154 determines the predicted curvature in the traveling route of the own vehicle 1, calculates a weight according to the predicted curvature (that is, weighting of information related to the traveling environment is performed), and outputs the calculation result (weight D). The predicted curvature determination unit 154 acquires the weight D by averaging the weight obtained when the own vehicle 1 is in automatic driving and the weight obtained when the own vehicle 1 is in non-automatic driving in a predetermined time range.

The predicted curvature determination unit 154 acquires the target route and the curvature during automatic driving. For example, the weight=0.5 is set when the curvature is small (that is, in the case of a gentle curve), the weight=0.1 is set when the curvature is large (that is, in the case of a sharp curve), and the weight=0.9 is set when the curvature is 0 (that is, in the case of a straight line).

Similarly, during non-automatic driving, the curvature obtained from the external-environment sensor 207 is acquired. For example, in a case where the curvature is small (that is, in the case of a gentle curve), the weight is set to 0.5. In a case where the curvature is large (that is, in the case of a sharp curve), the weight is set to 0.1. In a case where the curvature is 0 (that is, in the case of a straight line), the weight is set to 0.9.

Then, a weight D is obtained by obtaining a time average of weights during automatic driving and non-automatic driving.

Although the case where the degree of weighting on the curvature is the same between the automatic driving and the non-automatic driving has been exemplified, the degree of weighting may be set to be different. For example, a table in which the weight decreases according to the increase in the predicted curvature may be prepared in advance, and the weight may be obtained using the table. Various numerical values in the above processing are examples and can be changed as appropriate.

Figure 10:
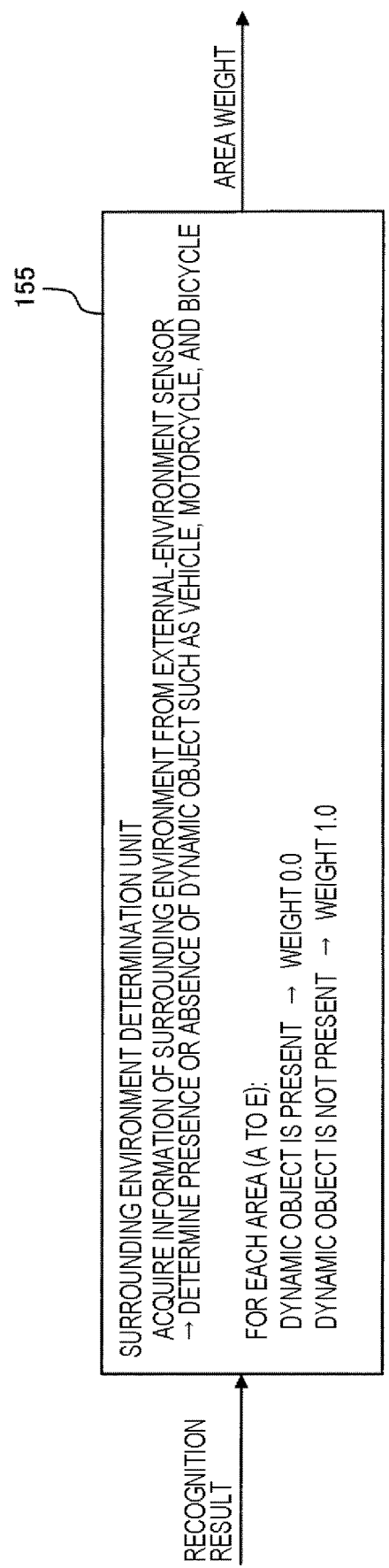
FIG. 10 is a diagram illustrating processing contents of a surrounding environment determination unit.

FIG. 10 is a diagram illustrating processing contents of the surrounding environment determination unit.

As illustrated in FIG. 10, the surrounding environment determination unit 155 determines the presence or absence of another dynamic object (for example, other vehicles, motorcycles, bicycles, and the like) in the surrounding environment of the own vehicle 1 on the basis of the recognition result from the external-environment sensor 207, calculates a weight according to the determination result for each detection area (front area E, and peripheral areas A, B, C, and D) (that is, weighting of information related to the surrounding environment is performed), and outputs a calculation result (area weight). In the surrounding environment determination unit 155, for example, the weight of the detection area where the dynamic object exists is set to 0.0, and the weight of the detection area where the dynamic object does not exist is set to 1.0.

Figure 19:
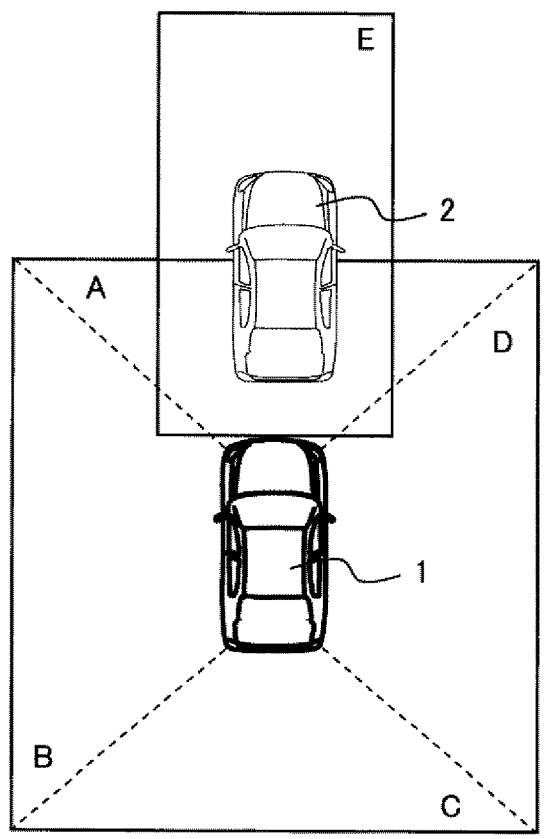
FIG. 19 is a diagram illustrating an example of a surrounding environment of an own vehicle.
Figure 20:
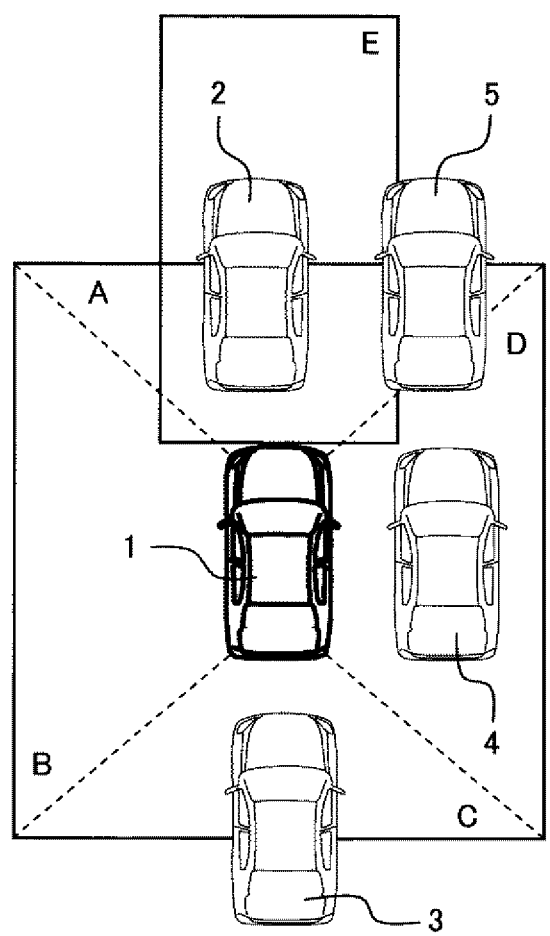
FIG. 20 is a diagram illustrating an example of a surrounding environment of an own vehicle.
Figure 21:
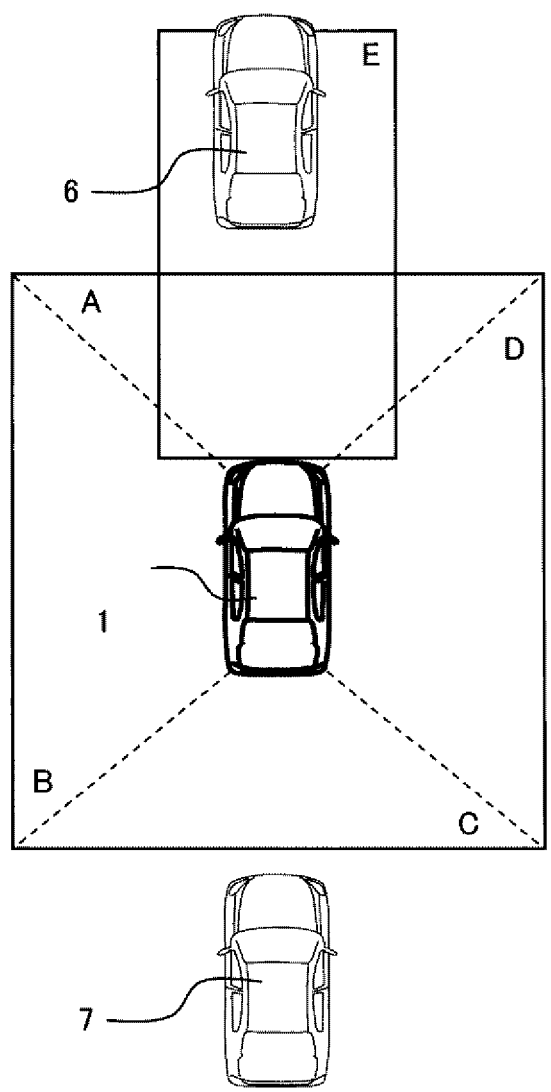
FIG. 21 is a diagram illustrating an example of a surrounding environment of an own vehicle.

FIGS. 19 to 21 are diagrams illustrating an example of a surrounding environment of the own vehicle.

For example, as illustrated in FIG. 19, when another vehicle 2 exists in front of the own vehicle 1, that is, when a dynamic object exists in a detection area (front area E, peripheral area A) in front of the own vehicle 1, the surrounding environment determination unit 155 sets weights of the front area E and the peripheral area A to 0.0, and sets weights of the peripheral areas B, C, and D to 1.0. For example, as illustrated in FIG. 20, in a case where other vehicles 2, 3, 4, and 5 exist in front of, behind, on the right side of, and diagonally to the right front of the own vehicle 1, respectively, that is, in a case where dynamic objects exist in the front and peripheral detection areas (front area E, peripheral areas A, C, and D), the weights of the front area E and the peripheral areas A, C, and D are set to 0.0, and the weight of the peripheral area B is set to 1.0. For example, as illustrated in FIG. 21, in a case where other vehicles 6 and 7 exist relatively far in front of and behind the own vehicle 1, respectively, that is, in a case where dynamic objects exist in a detection area (front area E) in front of the own vehicle 1, the weight of the front area E is set to 0.0, and the weights of the peripheral areas A, B, C, and D are set to 1.0.

Figure 11:
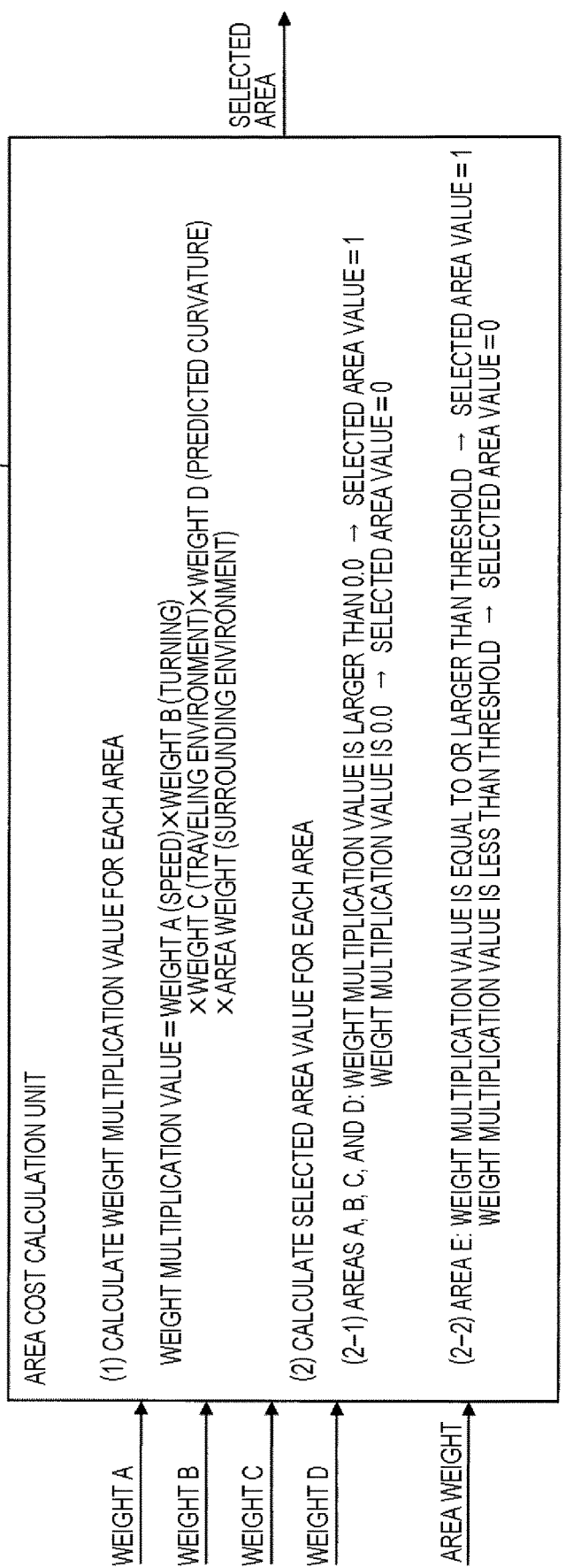
FIG. 11 is a diagram illustrating processing contents of an area cost calculation unit.

FIG. 11 is a diagram illustrating processing contents of the area cost calculation unit.

As illustrated in FIG. 11, the area cost calculation unit 156 calculates and outputs the selected area value of each detection area (front area E, peripheral areas A, B, C, and D) according to the calculation results (weights A, B, C, and D, area weight) from the speed determination unit 151, the turning determination unit 152, the traveling environment determination unit 153, the predicted curvature determination unit 154, and the surrounding environment determination unit 155. The area cost calculation unit 156 calculates a weight multiplication value for each detection area, and sets a selected area value of each detection area according to the weight multiplication value.

That is, the area cost calculation unit 156 first calculates a weight multiplication value=weight A (speed)×weight B (turning)×weight C (traveling environment)×weight D (predicted curvature)×area weight (surrounding environment) for each detection area.

Subsequently, for the peripheral areas A, B, C, and D, the selected area value of the detection area having the weight multiplication value larger than 0.0 is set to 1, and the selected area value of the detection area having the weight multiplication value of 0.0 is set to 0. Similarly, for the peripheral area E, when the weight multiplication value is equal to or larger than the predetermined threshold value, the selected area value is set to 1, and when the weight multiplication value is less than the predetermined threshold value, the selected area value is set to 0.

As a specific example of the processing content in the area cost calculation unit 156, for example, in a case where the own vehicle 1 is traveling at 100 km/h on a straight expressway and no other dynamic object exists in the vicinity, the weights A to D and the area weights are set as the weight A (speed)=1.0, the weight B (turn)=0.9, the weight C (traveling environment)=0.9, the weight D (predicted curvature)=0.9, and the area weight (surrounding environment)=1.0 (all detection areas). Here, the weight multiplication value of the front area E=0.729. Therefore, when the threshold is smaller than 0.729, the selected area value of the front area E is 1. Since the weight multiplication values of the peripheral areas A, B, C, and D are 0.0, the selected area values of the peripheral areas A, B, C, and D are 0.

For example, when the own vehicle 1 travels at 50 km/h on a JCS (junction) curve of an expressway and no other dynamic object exists in the periphery, the weights A to D and the area weights are set as the weight A (speed)=0.5, the weight B (turn)=0.5, the weight C (traveling environment)=0.9, the weight D (predicted curvature)=0.5, and the area weight (surrounding environment)=1.0 (all detection areas). Here, since the weight multiplication value of the front area E=0.1125, when the threshold value is larger than 0.1125, the selected area value of the front area E=0. Since the weight multiplication values of the peripheral areas A, B, C, and D are 0.0125, the selected area values of the peripheral areas A, B, C, and D are 1.

For example, in a case where the own vehicle 1 is caught in a traffic jam on a national highway, stops and starts repeatedly, travels on the left lane, and there are other dynamic objects (other vehicles) in front of, behind, and on the right side, the weights A to D are set as the weight A (speed)=1.0, the weight B (turn)=0.9, the weight C (traveling environment)=0.7, and the weight D (predicted curvature)=0.9. The area weight (surrounding environment) of the peripheral area B is 1.0, and the area weights (surrounding environment) of the front area E and the peripheral areas A, C, and D are 0.0. Here, since the weight multiplication value of the front area E=0, when the threshold is larger than 0.0, the selected area value of the front area E=0. Since the weight multiplication values of the peripheral areas A, C, and D are 0.0, the selected area values of the peripheral areas A, C, and D are 0. Since the weight multiplication value of the peripheral area B is 0.0027, the selected area value of the peripheral area B is 1.

For example, when the own vehicle 1 is waiting for a traffic light at the head position of the right lane at the intersection and there are other dynamic objects (other vehicles) behind and on the left, the weights A to D are set as the weight A (speed)=0.1, the weight B (turn)=0.9, the weight C (traveling environment)=0.5, and the weight D (predicted curvature)=0.9. The area weight (surrounding environment) of the front area E and the peripheral areas A and D is 1.0, and the area weights (surrounding environment) of the front areas B and C are 0.0. Here, since the weight multiplication value of the front area E is 0.045, when the threshold is smaller than 0.0045, the selected area value of the front area E is 1. Since the weight multiplication values of the peripheral areas A and D are 0.0045, the selected area values of the peripheral areas A and D are 1. Since the weight multiplication values of the peripheral areas B and C are 0.0, the selected area values of the peripheral areas B and C are 0.

Returning to FIG. 4, the description continues.

The vehicle movement amount estimation unit 160 estimates the movement amount and the movement direction of the vehicle using the vehicle speed information and the steering angle information acquired from the vehicle internal sensor 203. As a method of estimating the movement amount and the movement direction of the vehicle, various methods are conceivable, and for example, it is conceivable to use a dead reckoning technique of estimating a relative position from a certain reference point.

The vehicle position fusion unit 170 calculates the position of the own vehicle 1 by fusing the position information of the own vehicle 1 estimated by the front matching unit 130, the position information of the own vehicle 1 estimated by the peripheral matching unit 140, and the movement amount of the own vehicle 1 estimated by the vehicle movement amount estimation unit 160, and outputs the position to the control device 300.

Various methods for calculating the position of the own vehicle 1 are conceivable, and for example, it is conceivable to use an extended Kalman filter. In this case, the vehicle position fusion unit 170 performs fusion by the extended Kalman filter using the speed, angular speed, sideslip angle, and time of the own vehicle 1 estimated by the vehicle movement amount estimation unit 160 and the position, posture, and time of the own vehicle estimated by the front matching unit 130 and the peripheral matching unit 140, and calculates the position of the own vehicle 1.

Figure 22:
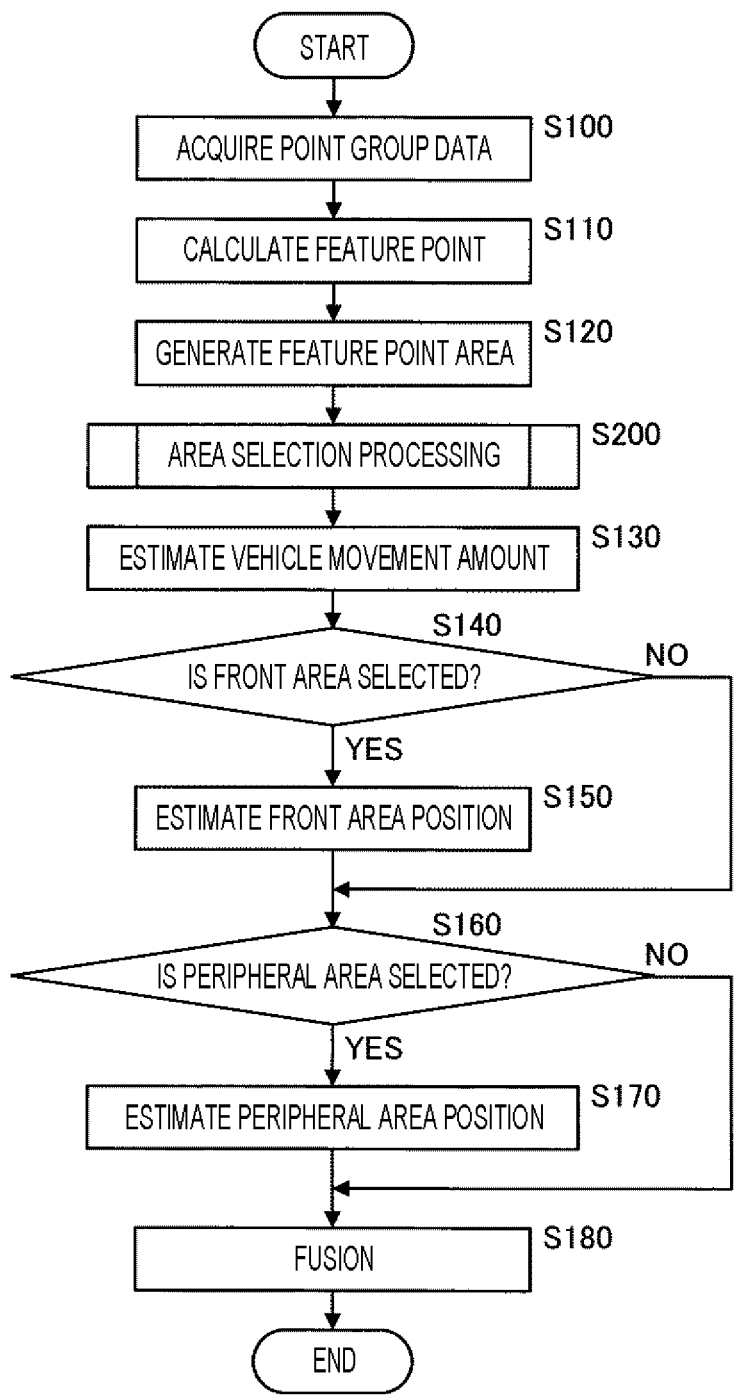
FIG. 22 is a flowchart illustrating processing contents in an own vehicle position estimation device.

FIG. 22 is a flowchart illustrating processing contents in the own vehicle position estimation device.

In FIG. 22, the feature point detection unit 110 of the own vehicle position estimation device 100 first acquires point group data from the front sensor 201 and the peripheral sensor 202 (step S100), and detects feature points of peripheral objects (step S110).

Subsequently, the feature point area generation unit 120 associates the plurality of feature points detected by the feature point detection unit 110 with any of a plurality of predetermined detection areas, thereby dividing the plurality of feature points into a plurality of feature point groups each including a plurality of feature points (step S120).

Subsequently, in the area selection processing, the used feature point area determination unit 150 determines whether each feature point group belonging to each detection area (front area E, and peripheral areas A, B, C, and D) is to be used in the estimating of the position of the own vehicle 1 (that is, whether the selected area value is set to 1) on the basis of information from the vehicle internal sensor 203, the GNSS 204, the map storage unit 205, the target route setting unit 206, and the external-environment sensor 207 (step S200).

Subsequently, the vehicle movement amount estimation unit 160 estimates the movement amount of the own vehicle 1 (step S130).

Subsequently, in the area selection processing (step S200), the front matching unit 130 determines whether the front area E has been selected, that is, whether the selected area value of the front area E is 1, and when the determination result is YES, the position of the own vehicle 1 is estimated using the feature point group of the front area E (step S150).

If the process in step S150 is finished or if the determination result in step S140 is NO, subsequently, in the area selection processing (step S200), the peripheral matching unit 140 determines whether each of the peripheral areas A, B, C, and D is selected, that is, whether the selected area value of each of the peripheral areas A, B, C, and D is 1 (step S160).

When the determination result in step S160 is YES, the position of the own vehicle 1 is estimated using the feature point group of the peripheral area in which the selected area value=1 (step S170).

When the process in step S170 is ended or when the determination result in step S160 is NO, subsequently, the vehicle position fusion unit 170 calculates the position of the own vehicle 1 by fusing the calculation results in the front matching unit 130 and the peripheral matching unit 140 (step S180), and ends the process.

Figure 23:
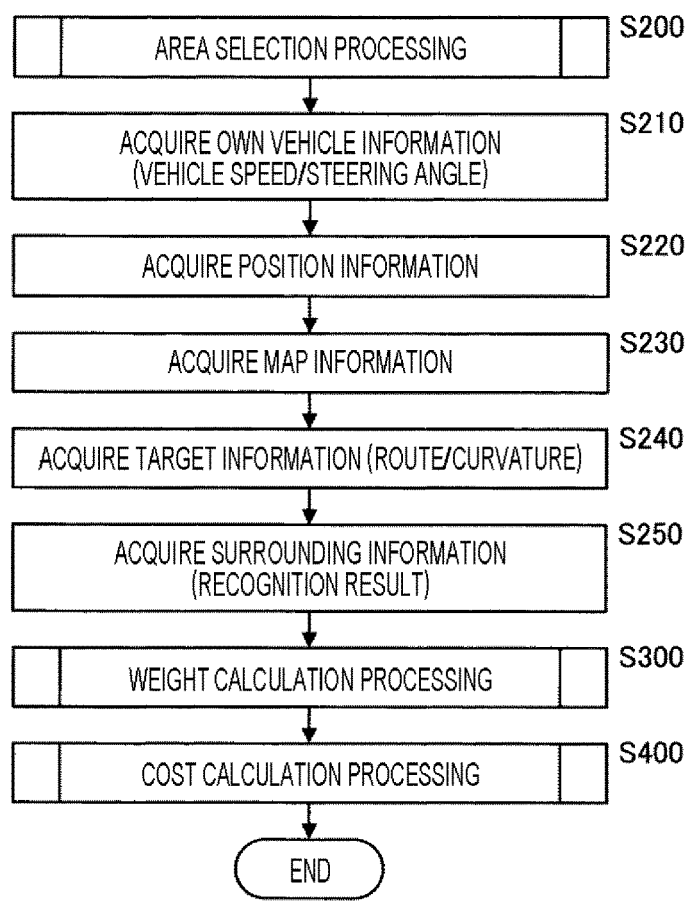
FIG. 23 is a flowchart illustrating processing contents of area selection processing in the used feature point area determination unit.

FIG. 23 is a flowchart illustrating processing contents of area selection processing in the used feature point area determination unit.

In FIG. 23, the speed determination unit 151 and the turning determination unit 152 of the used feature point area determination unit 150 acquire own vehicle information such as vehicle speed information and steering angle information from the vehicle internal sensor 203 (step S210).

The traveling environment determination unit 153 acquires position information from the GNSS 204 (step S220), and the traveling environment determination unit 153 and the predicted curvature determination unit 154 acquire map information from the map storage unit 205 (step S230).

The predicted curvature determination unit 154 acquires target information such as route information and curvature information from the target route setting unit 206 (step S240), and the surrounding environment determination unit 155 and the predicted curvature determination unit 154 acquire recognition result information from the external-environment sensor 207 (step S250).

Subsequently, the speed determination unit 151, the turning determination unit 152, the traveling environment determination unit 153, the predicted curvature determination unit 154, and the surrounding environment determination unit 155 perform weight calculation processing (see FIGS. 6 to 10) to calculate the weights A, B, C, and D and the area weight (step S300), and the area cost calculation unit 156 performs cost calculation processing (see FIG. 11) to calculate the selected area value (step S400), and ends the process.

The effects of the present embodiment configured as described above will be described.

As a technique for safe driving, automatic driving, and the like, there is known a technique for determining a position of an own vehicle based on information obtained from sensors provided in the own vehicle. In such a technology, the detection accuracy of the sensors affects the accuracy of the position estimation of the own vehicle, but the detection accuracy of the sensors varies depending on the traveling situation of the own vehicle.

Figure 24:
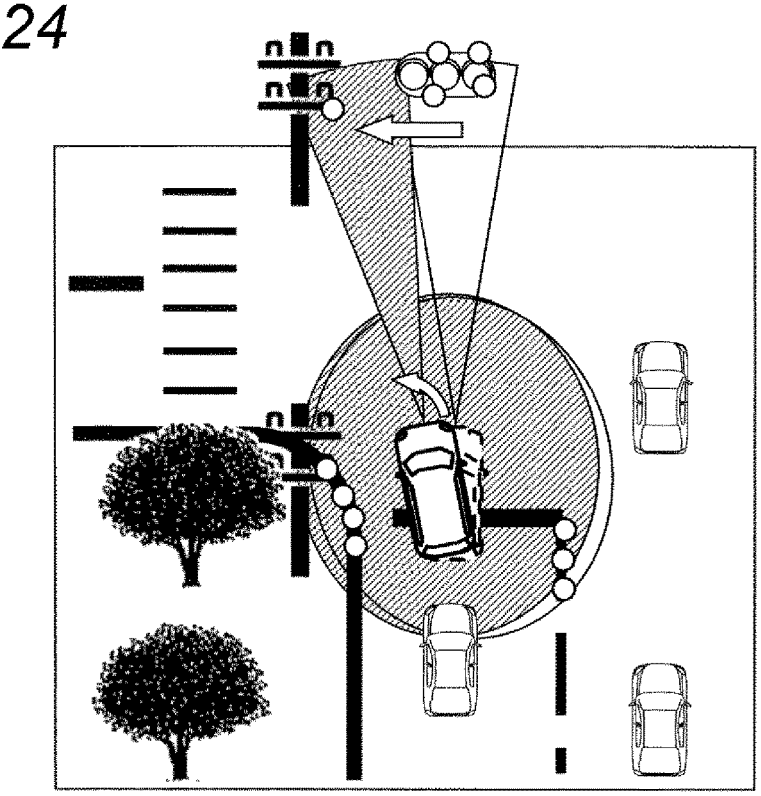
FIG. 24 is a diagram illustrating an example of a traveling situation.

For example, as illustrated in FIG. 24, in a case of a traveling situation where a large steering angle is obtained in low speed travel such as turning left (or right) at an intersection, a change amount (movement amount in a lateral direction) of a detection range of a front sensor of a long distance narrow angle becomes large, and thus detection accuracy tends to decrease, and influence on the accuracy of position estimation is large. On the other hand, since the change amount (movement amount in the lateral direction) of the detection range of the short-distance omnidirectional peripheral sensors is relatively small, the detection accuracy tends to be less likely to deteriorate, and the influence on the accuracy of position estimation is small.

Figure 25:
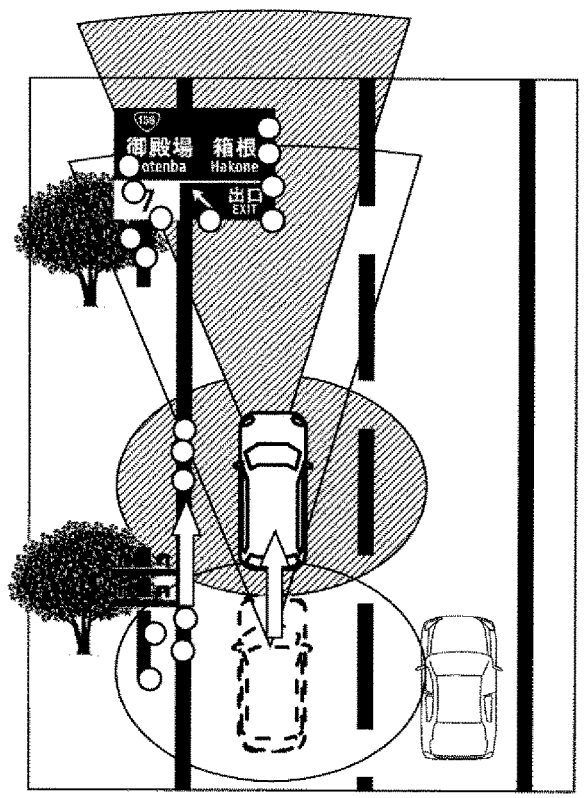
FIG. 25 is a diagram illustrating an example of a traveling situation.

For example, as illustrated in FIG. 25, in a case of a traveling situation in which high-speed traveling is performed such as traveling on an expressway, since the amount of change in the detection range of the front sensor at a long distance narrow angle is relatively small, the detection accuracy tends to be less likely to decrease, and the influence on the accuracy of position estimation is small. On the other hand, since the detection range of the short-distance omnidirectional peripheral sensors has a large change amount, the detection accuracy tends to be easily deteriorated, and the influence on the accuracy of position estimation is large.

Figure 26:
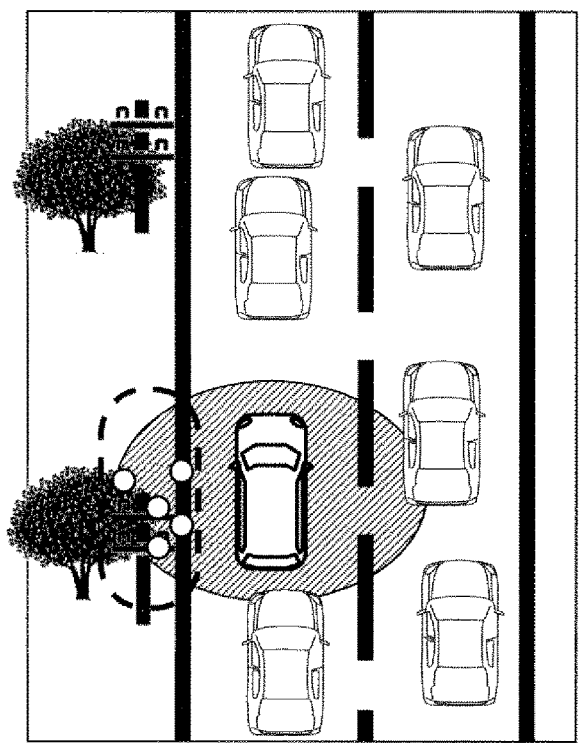
FIG. 26 is a diagram illustrating an example of a traveling situation.

For example, as illustrated in FIG. 26, in a case of a traveling situation where low speed traveling is performed such as in a traffic jam, the detection range of the front sensor at a long distance narrow angle is blocked by another vehicle or the like in front, and thus, the detection accuracy is likely to decrease, and the influence on the accuracy of position estimation is large. On the other hand, since the detection ranges of the short-distance omnidirectional peripheral sensors have a small change amount, the detection accuracy tends to be less likely to decrease even in a case where the range in which information is obtained is limited, and the influence on the accuracy of position estimation is small.

Figure 27:
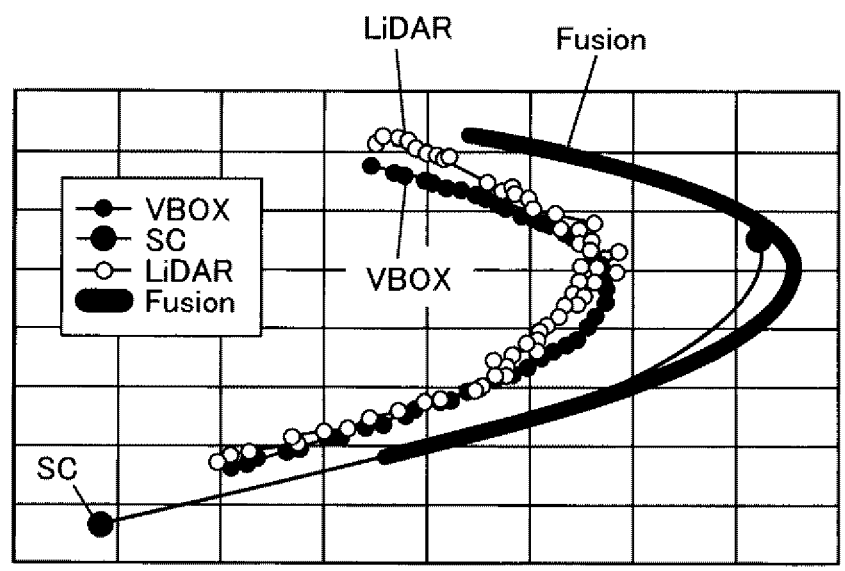
FIG. 27 is a diagram illustrating an example of a fusion result in the prior art.

In such various traveling situations, in a case where the position of the own vehicle is estimated from the feature point detected from the detection result of each sensor and the feature point of the map, and the own vehicle position is estimated by fusing the estimation result of the position, as illustrated in FIG. 27, the fusion result is affected by the detection result in which the detection accuracy is deteriorated, and the estimation result of the position is deteriorated.

Therefore, in the present embodiment, the position estimation system provided in a vehicle includes: a front sensor configured to detect an object in front of the vehicle; a peripheral sensor configured to detect an object around the vehicle in a detection range, the detection range being a range shorter than the front sensor and including at least a left-right direction of the vehicle; a position estimation device configured to detect a plurality of feature points of an object from a detection result of at least one of a detection result of the front sensor and a detection result of the peripheral sensor, and estimate a position of the vehicle using the plurality of detected feature points; and a control device configured to control an operation of the vehicle based on an estimation result of the position estimation device. The position estimation device is configured to: weight each of a plurality of pieces of information related to a state of the vehicle and weigh information related to a surrounding environment of the vehicle; and select whether to use a plurality of feature point groups including a part of the plurality of feature points detected by the front sensor and the peripheral sensor for the position estimation for each of the feature point groups based on a result of the weighting. Therefore, it is possible to more accurately estimate the position of the own vehicle according to the traveling state or the traveling environment of the own vehicle.

First Modification

Figure 28:
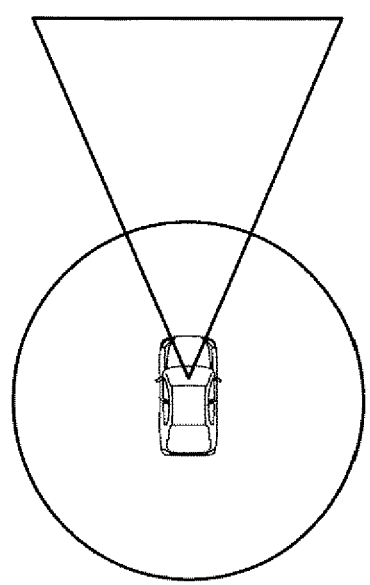
FIG. 28 is a diagram illustrating another example of the sensor configuration.
Figure 29:
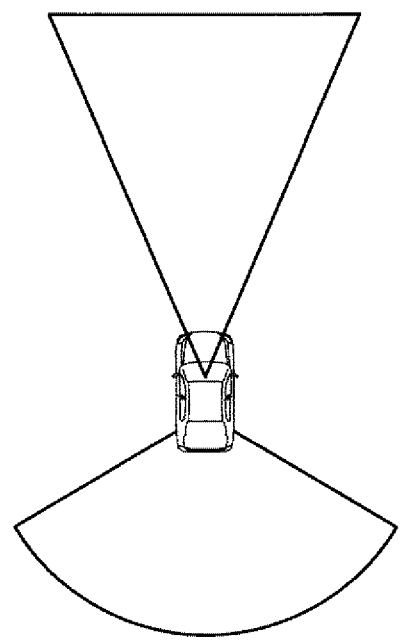
FIG. 29 is a diagram illustrating another example of the sensor configuration.
Figure 30:
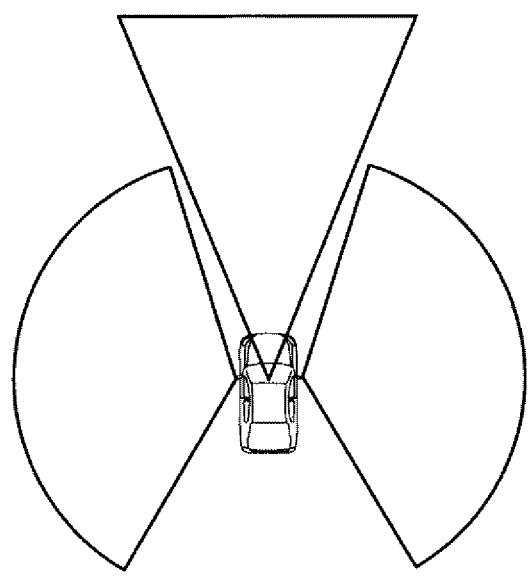
FIG. 30 is a diagram illustrating another example of the sensor configuration.
Figure 31:
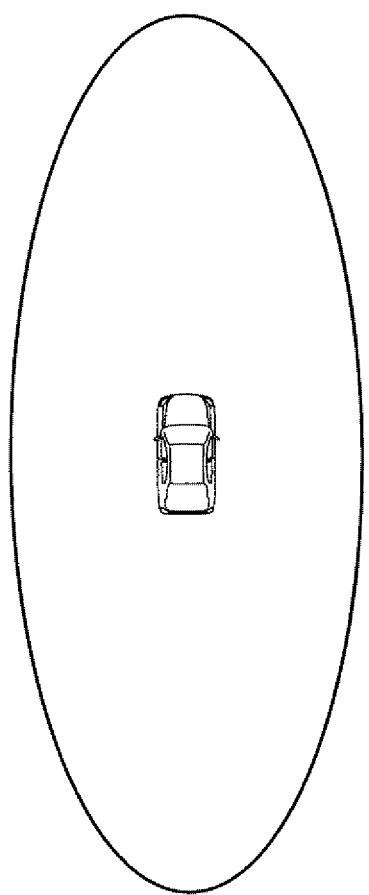
FIG. 31 is a diagram illustrating another example of the sensor configuration.

In the first embodiment, a case where a plurality of feature point groups is generated by associating a plurality of feature points (a plurality of feature point groups) detected from measurement results obtained by the front sensor 201 and the peripheral sensor 202 (sensors 202a, 202b, 202c, and 202d) with a preset detection area (front area E, peripheral areas A, B, C, and D) has been exemplified. However, for example, as illustrated in FIG. 28, a configuration may be employed in which one sensor that collectively detects objects around the own vehicle 1 is used as a peripheral sensor, a detection range of the peripheral sensor is divided in advance according to a relative position with the own vehicle 1, and the divided detection range and the detection area are associated in advance to generate the feature point group. Even in a case where a front sensor and a rear sensor are used as illustrated in FIG. 29, a case where a front sensor and side sensors on the left and right sides are used as illustrated in FIG. 30, or a case where a peripheral sensor having a long detection range in the front-rear direction is used as illustrated in FIG. 31, the detection area (here, the sensor) may be selected according to the traveling situation.

Second Modification

As compared with the first embodiment, it may be configured such that the number of sampling times of the sensor related to the selected feature point group (that is, the detection area in which the selected area value is 1) used for position estimation is further increased among the plurality of sub-sensors (sensors 202a, 202b, 202c, and 202d) of the front sensor 201 and the peripheral sensor 202.

In the position estimation, the accuracy of the position estimation is improved as the number of feature points (point density) used for the calculation increases, but the calculation time increases exponentially, and thus, it is necessary to appropriately distribute the accuracy of the position estimation and the calculation time.

Therefore, in the present modification, the number of sampling times of the sensor related to the detection area in which the selected area value=1 is further increased according to the number of sensors related to the detection area in which the selected area value=0, with respect to the first embodiment configured such that the position estimation is performed using the detection result of the sensor having a small influence on the detection accuracy according to the traveling situation (that is, the selected area value of the detection area related to the sensor is set to 1), and the detection result of the sensor having a large influence on the detection accuracy is not used for the position estimation (that is, the area value of the detection area related to the sensor is set to 0). At this time, the calculation resource used for the calculation of the position estimation based on the detection result of the unselected sensor is used for the calculation related to the feature point increased by the increase in the number of sampling times.

This makes it possible to estimate the position of the own vehicle with higher accuracy while suppressing an increase in calculation time.

Third Modification

In the first embodiment, the used feature point area determination unit 150 weights the information, and selects the detection area of the feature point group used for the position estimation of the own vehicle 1 according to the selected area value set according to the result of the weighting. Alternatively, the detection area having a large number of feature points may be selected, and the feature point may be used for the position estimation.

Fourth Modification

In the first embodiment, a surface position of an object is detected as a point group by the front sensor 201 and the peripheral sensor 202, and position estimation is performed using feature points detected from the point group (so-called point group matching). However, other methods may be used. For example, road surface painting information such as a white line and a stop line on a high precision map may be associated with road surface painting information of a map from an acquisition result from a sensor, or may be associated from landmark information such as a sign, a signal, a signboard, and a telegraph pole.

APPENDIX

The present invention is not limited to the above embodiments, but various modifications and combinations may be contained. For example, the above-described embodiments of the invention have been described in detail in a clearly understandable way, and are not necessarily limited to those having all the described configurations. In addition, some or all of the configurations and functions may be realized by an integrated circuit. The configurations and the functions may be realized in software such that a processor analyzes and performs a program which realizes each function.

REFERENCE SIGNS LIST 1 own vehicle
2 to 7 other vehicles
100 own vehicle position estimation device
110 feature point detection unit
120 feature point area generation unit
130 front matching unit
140 peripheral matching unit
150 used feature point area determination unit
151 speed determination unit
152 turning determination unit
153 travel environment determination unit
154 predicted curvature determination unit
155 surrounding environment determination unit
156 area cost calculation unit
160 vehicle movement amount estimation unit
170 vehicle position fusion unit
201 front sensor
202 peripheral sensor
202a to 202d sensor
203 vehicle internal sensor
204 GNSS
205 map storage unit
206 target route setting unit
207 external-environment sensor
300 control device

The invention claimed is:

1. A position estimation system provided in a vehicle, comprising:
a front sensor configured to detect an object in front of the vehicle;
a peripheral sensor configured to detect an object around the vehicle in a detection range, the detection range being a range shorter than the front sensor and including at least a left-right direction of the vehicle, the peripheral sensor including a plurality of sub-sensors with detection ranges in different directions around the vehicle;
a position estimation device configured to detect a plurality of feature points of an object from a detection result of at least one of a detection result of the front sensor and a detection result of the peripheral sensor, and estimate a position of the vehicle using the plurality of detected feature points; and
a control device configured to control an operation of the vehicle based on an estimation result of the position estimation device, wherein
the position estimation device is configured to:
determine weights for each of a plurality of pieces of information related to a state and a surrounding environment of the vehicle, each of the plurality of pieces of information corresponding to a feature point group of a plurality of feature point groups, the plurality of pieces of information comprising vehicle speed, steering angle, traveling environment, predicted curvature, and surrounding environment, wherein a weight for vehicle speed increases with the vehicle speed, a weight for steering angle decreases as the steering angle increases, a weight for traveling environment is determining according to a type of road, a weight for predicted curvature increases as a road curvature decreases, and a weight for the surrounding environment increases in response to determining an absence of a dynamic object;
select, for each feature point group, whether to use a feature point group including feature points detected from the detection result of the front sensor and a plurality of feature point groups including feature points detected from measurement results of a plurality of sub-sensors of the front sensor for the position estimation based on the result of the weighting,
increase a number of sampling times of the front sensor or the sub-sensor related to a feature point group selected for use in the position estimation, among the plurality of sub-sensors of the front sensor and the peripheral sensor, and
decrease a number of sampling times of the front sensor or the sub-sensor related to a feature point group other than the feature point group selected for use in the position estimation, among the plurality of sub-sensors of the front sensor and the peripheral sensor.

2. The position estimation system according to claim 1, wherein
the position estimation device includes:
a front matching unit configured to compare and associate the plurality of feature points detected from the detection result of the front sensor with a plurality of predetermined feature points on a map to estimate the position of the vehicle on the map; and
a peripheral matching unit configured to compare and associate the plurality of feature points detected from the detection result of the peripheral sensor with feature points of the map to estimate the position of the vehicle on the map.

3. The position estimation system according to claim 1, wherein the position estimation device includes:
a speed determination unit configured to determine the weight for the vehicle speed of the vehicle;
a steering angle determination unit configured to determine the weight for the steering angle of the vehicle;
a traveling environment determination unit configured to determine the weight for the traveling environment of the vehicle;
a predicted curvature determination unit configured to determine the weight for the road curvature of a travel route of the vehicle;
a surrounding environment determination unit configured to determine the weight for the surrounding environment of the vehicle; and
an area cost calculation unit configured to select, for each of the feature point groups, whether to use the plurality of feature point groups for the position estimation, based on results of weighting by the speed determination unit, the steering angle determination unit, the traveling environment determination unit, the predicted curvature determination unit, and the surrounding environment determination unit.

4. The position estimation system according to claim 1, wherein the position estimation device includes:

a surrounding environment determination unit configured to acquire, as information related to a surrounding environment of the vehicle, information on whether another vehicle different from the vehicle is present in a detection range of the front sensor, and information on whether another vehicle different from the vehicle is present in the detection range of the peripheral sensor, and weight the information, and whether to use a feature point group including feature points detected from the detection result of the front sensor and a feature point group including feature points detected from the detection result of the front sensor for the position estimation is selected for each feature point group based on a result of weighting by the surrounding environment determination unit.

5. The position estimation system according to claim 1, wherein the position estimation device selects, for each of a plurality of detection areas including a part of a detection range of the front sensor and a part of a detection range of the peripheral sensor, whether to use a feature point included in each of the plurality of detection areas for the position estimation based on the result of the weighting.

6. The position estimation system according to claim 5, wherein the position estimation device selects a feature point of a detection area having a larger number of the feature points than another detection area to be used for the position estimation.

\* \* \* \* \*